United States Patent [19]

Kumar

[11] Patent Number: 5,571,309
[45] Date of Patent: Nov. 5, 1996

[54] ADSORPTION PROCESS

[75] Inventor: Ravi Kumar, Allentown, Pa.

[73] Assignee: The BOC Group, Inc., New Providence, N.J.

[21] Appl. No.: 508,375

[22] Filed: Jul. 28, 1995

[51] Int. Cl.$^6$ ................................................. B01D 53/047
[52] U.S. Cl. ................................. 95/99; 95/105; 95/106; 95/125; 95/139
[58] Field of Search ............................... 95/95–106, 115, 95/117–126, 139, 148

[56] References Cited

U.S. PATENT DOCUMENTS

| | | | |
|---|---|---|---|
| 3,838,553 | 10/1974 | Doherty | 95/98 |
| 3,967,464 | 7/1976 | Cormier et al. | 62/13 |
| 3,981,698 | 9/1976 | Leppard | 55/31 |
| 4,013,429 | 3/1977 | Sircar et al. | 55/33 |
| 4,249,915 | 2/1981 | Sircar et al. | 55/26 |
| 4,402,712 | 9/1983 | Benkmann | 95/98 |
| 4,522,637 | 6/1985 | Becker | 95/96 |
| 4,761,167 | 8/1988 | Nicholas et al. | 95/98 X |
| 5,078,757 | 1/1992 | Rottner et al. | 95/98 |
| 5,156,657 | 10/1992 | Jain et al. | 55/26 |
| 5,232,474 | 8/1993 | Jain et al. | 55/26 |
| 5,415,682 | 5/1995 | Zarchy et al. | 95/102 X |
| 5,486,227 | 1/1996 | Kumar et al. | 95/99 X |
| 5,503,658 | 4/1996 | Zarchy et al. | 95/102 X |

OTHER PUBLICATIONS

A Unique Scheme for Adsorptive Gas Separations: Processing Diferent Pressure Feed Steams in a Single Unit—R. Kumar, D. E. Guro and W. P. Schmidt—Presented at the 1994 AlChE meeting, Nov. 13–18, San Francisco, USA.

*Primary Examiner*—Robert Spitzer
*Attorney, Agent, or Firm*—David M. Rosenblum; Larry R. Cassett

[57] ABSTRACT

An adsorption process in which high and low pressure feed streams are introduced into a plurality of beds to produce product streams by adsorbing one or more preferentially adsorbed components within the beds. Each bed is subjected to a low pressure feed stage to produce a low pressure product stream followed by a high or higher pressure feeding stages to produce one or more high pressure product streams. Thereafter the beds are regenerated through depressurization and purge stages. The cycle is conducted out of phase so that one of the beds is producing the high pressure product stream while another bed is producing a low pressure product stream.

8 Claims, 4 Drawing Sheets

FIG. 3

CYCLE TIME →

| BED # | | | | | | | | | | |
|---|---|---|---|---|---|---|---|---|---|---|
| 30 | LOW PRESSURE FEED | RPH | HIGH PRESSURE FEED | DP | HOT PURGE | COLD PURGE | RPL | | | |
| 32 | FEED | DP | HOT PURGE | COLD PURGE | RPL | LOW PRESSURE FEED | RPH | HIGH PRESSURE FEED | | |
| 34 | RPH | HIGH PRESSURE FEED | DP | HOT PURGE | COLD PURGE | RPL | LOW PRESSURE FEED | | | |

FIG. 4

| BED # | | | | | | | | | | |
|---|---|---|---|---|---|---|---|---|---|---|
| 30 | LOW PRESSURE FEED | DP | FEED | PURGE | RPL | RPH | HIGH PRESSURE FEED | DP | PURGE | RPL |
| 32 | HIGH PRESSURE FEED | | | | | | LOW PRESSURE FEED | RPH | | HIGH PRESSURE |
| 34 | RPH | | | | | | PURGE | RPL | | LOW PRESSURE FEED |

CYCLE TIME →

ADSORPTION PROCESS

BACKGROUND OF THE INVENTION

The present invention relates to an adsorption process in which a feed stream is introduced into a plurality of adsorbent beds, operated in accordance with an out of phase cycle, to adsorb one or more preferentially adsorbed components contained within a feed stream and thereby produce a product stream. More particularly, the present invention relates to such an adsorption process in which high and low pressure feed streams are introduced into the adsorbent beds to produce high and low pressure product streams.

There are many industrial processes that require feed streams to be pre-treated by adsorption and thereafter to be delivered to the process at two or more pressures. As an example, air separation requires treatment of incoming feed air stream by adsorption beds to remove carbon dioxide and moisture from such feed stream. The treated feed stream can then be fed into the process at high and low operational pressures of distillation columns employed in distilling the treated air.

An example of this can be found in U.S. Pat. No. 4,964,901, in which air is separated by a low temperature rectification process employing higher and lower pressure columns operatively associated with one another by a condenser reboiler. In this process, air is compressed and purified to remove carbon dioxide and water vapor. Thereafter, the air is cooled to a temperature suitable for its rectification and is introduced as feed streams into the higher and lower pressure columns. The higher pressure column serves to separate the air into a nitrogen rich fraction and a crude liquid oxygen column bottoms. The crude liquid oxygen is further refined in the lower pressure column to produce a liquid oxygen column bottoms and a nitrogen rich tower overhead. In order to feed both the high and lower pressure columns with the feed streams, compressed and purified feed air streams are required at the pressure of the higher pressure column and the pressure of the lower pressure column. In order to effectuate the production of such feed streams, incoming air is compressed to the pressure of the lower pressure column and is then divided into two subsidiary streams. One subsidiary stream is further compressed and then purified in a pre-purification unit to form the high pressure feed stream. The other stream, which is at the pressure of the lower pressure column, is purified within a separate pre-purification unit.

In other processes requiring feed air streams at high and low pressures, all of the air is compressed to the pressure of the higher pressure column, pre-purified and then divided. One subsidiary stream is utilized at the higher pressure and the other subsidiary stream is expanded by valve expansion to the lower pressure of the lower pressure column. As can be appreciated, U.S. Pat. No. 4,964,901 is more energy efficient than the aforementioned process because not all of the air is compressed to the higher pressure. The disadvantage of the foregoing process is that two separate pre-purification units are required.

As will be discussed, the present invention provides an adsorption process which is capable of producing product streams at high and low pressures in which only a single unit is required for such purpose.

SUMMARY OF THE INVENTION

The present invention provides an adsorption process. In accordance with this process, at least a high and low pressure feed stream are introduced into a plurality of adsorption beds containing at least one adsorbent to adsorb at least one more preferentially adsorbed component contained within the high and low pressure feed streams. This adsorption produces high and low pressure product streams from adsorption by the at least one adsorbent.

The plurality of adsorbent beds are subjected to operational cycles, each having at least two adsorption stages comprising high and low pressure feed stages having the high and low pressure feed streams introduced into the adsorbent beds. Additionally, at least two repressurization stages are provided. These at least two repressurization stages are situated just prior to the high and low pressure feed stages. The at least two repressurization stages comprise a high pressure repressurization stage prior to the high pressure feed stage and a low pressure repressurization stage before the low pressure feed stage. Regeneration stages are provided for desorbing the at least one more preferentially adsorbed component. The operational cycles are conducted in an out of phase relationship with respect to one another so that the high and low pressure product streams are continually being produced.

The present invention encompasses both pressure-swing and temperature-swing adsorption processes. In either type of adsorption process in accordance with the present invention, each bed is first subjected to a low pressure feed to produce a low pressure product stream and then a high pressure feed to produce a high pressure product stream. It has been found by the inventor when that all things being equal, after subjecting an adsorbent bed to adsorption at low pressure, there will still be added capacity in the adsorbent bed to adsorb at high pressure. Hence, the use of a single adsorbent bed to adsorb at both low and high pressures requires less adsorbent than if two separate beds were provided that were respectively dedicated to adsorption at low and high pressures. Since only a single PSA or TSA unit is required in accordance with the present invention and such unit optimally utilizes adsorbent, lower acquisition costs can be realized. Additionally, since only a portion of the feed need be compressed to high pressure (as compared with the prior art in which all of the feed is compressed to high pressure) power savings can also be realized in conducting a process in accordance with the present invention.

BRIEF DESCRIPTION OF THE DRAWINGS

While the specification concludes with claims distinctly pointing out the subject matter that Applicant regards as his invention, it is believed that the invention will be better understood when taken in connection with the accompanying drawings in which:

FIG. 3 is a cycle chart of an adsorption process in accordance with the present invention that involves temperature swing adsorption; and FIG. 4 is a cycle chart of an adsorption process in accordance with the present invention that involves pressure swing adsorption.

DETAILED DESCRIPTION

Figure 1:
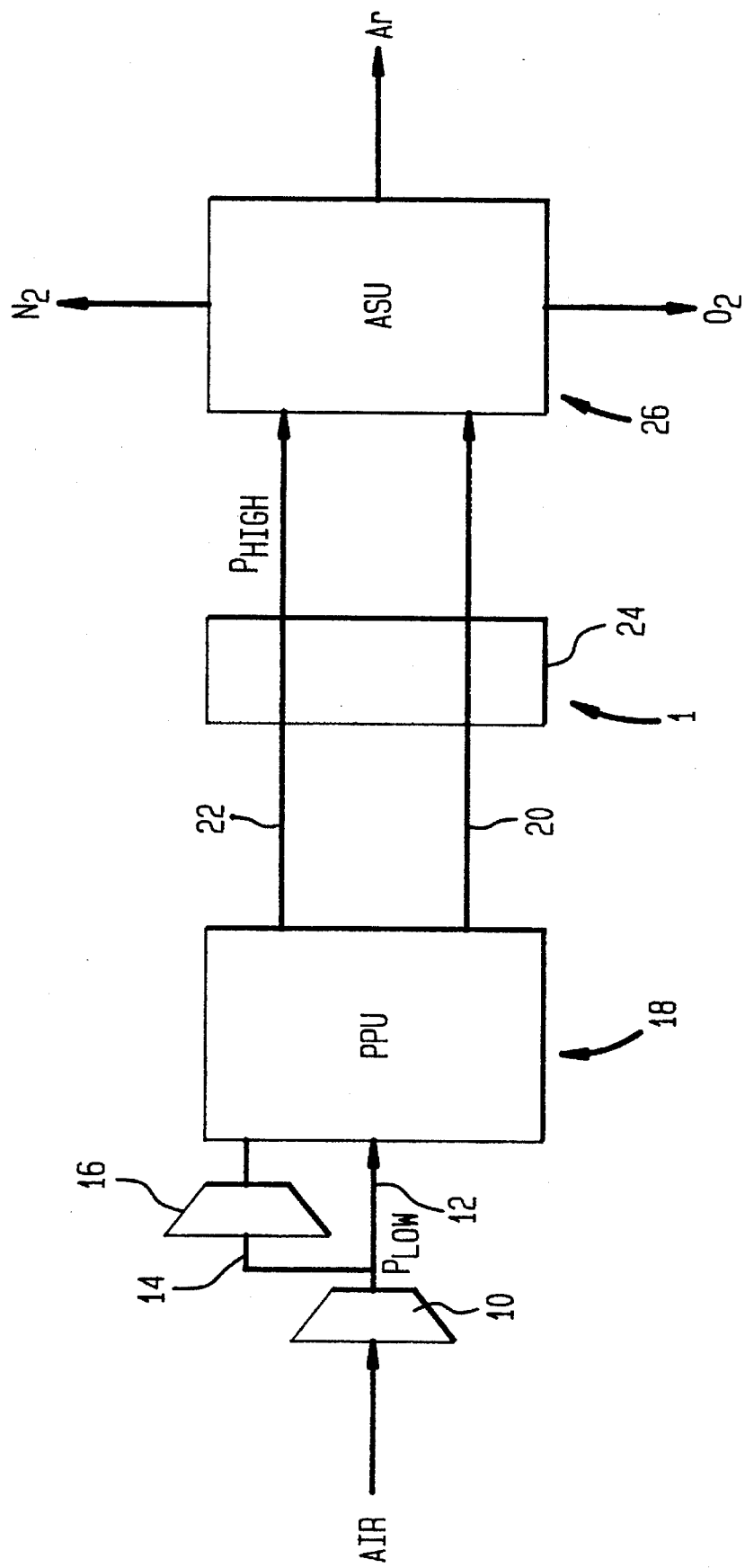
FIG. 1 is a schematic illustration of a pre-purification unit integrated with an air separation plant in accordance with the present invention.

With reference to FIG. 1, an integrated air separation plant 1 is disclosed in which air after having been filtered is compressed in a main compressor 10. The air is then divided into a main air stream 12 and a subsidiary air stream 14 which is further compressed within a booster compressor 16. Streams 12 and 14 are thereafter introduced into a pre-purification unit 18 in accordance with the present invention.

Pre-purification unit 18 purifies main and subsidiary air streams 12 and 14 and produces low and high pressure air streams 20 and 22 (as product) that have pressures that were imparted to them by main air compressor 10 and booster compressor 16, respectively. Low and high pressure air streams 20 and 22 are cooled to a temperature suitable for the rectification in a main heat exchanger 24 and are thereafter introduced into an air separation unit 26 which separates the air to produce nitrogen, oxygen and perhaps argon rich products.

Air separation unit 26 can be a single column oxygen generator, a single column nitrogen generator (in which case no argon rich product is produced). Additionally, air separation unit 26 can be a double column air separation plant having columns operating at higher and lower pressures, operatively associated with one another by a condenser-reboiler arrangement. Such double column could also have an argon column to produce an argon rich product. In case of the double column, lower pressure air stream 20 might be fed directly into higher pressure column while the higher pressure air stream 22 might be expanded, through engine expansion, to produce refrigeration and thereafter, be introduced into the lower pressure column. As could be appreciated by those skilled in the art, even in single column plants (oxygen and nitrogen generators) boosted pressure streams might be necessary. Furthermore, it is to be noted that the present invention though, is not limited to air separation plants and would have application to any process requiring high and low pressure streams either as reactants or as streams to be purified or otherwise treated.

Figure 2:
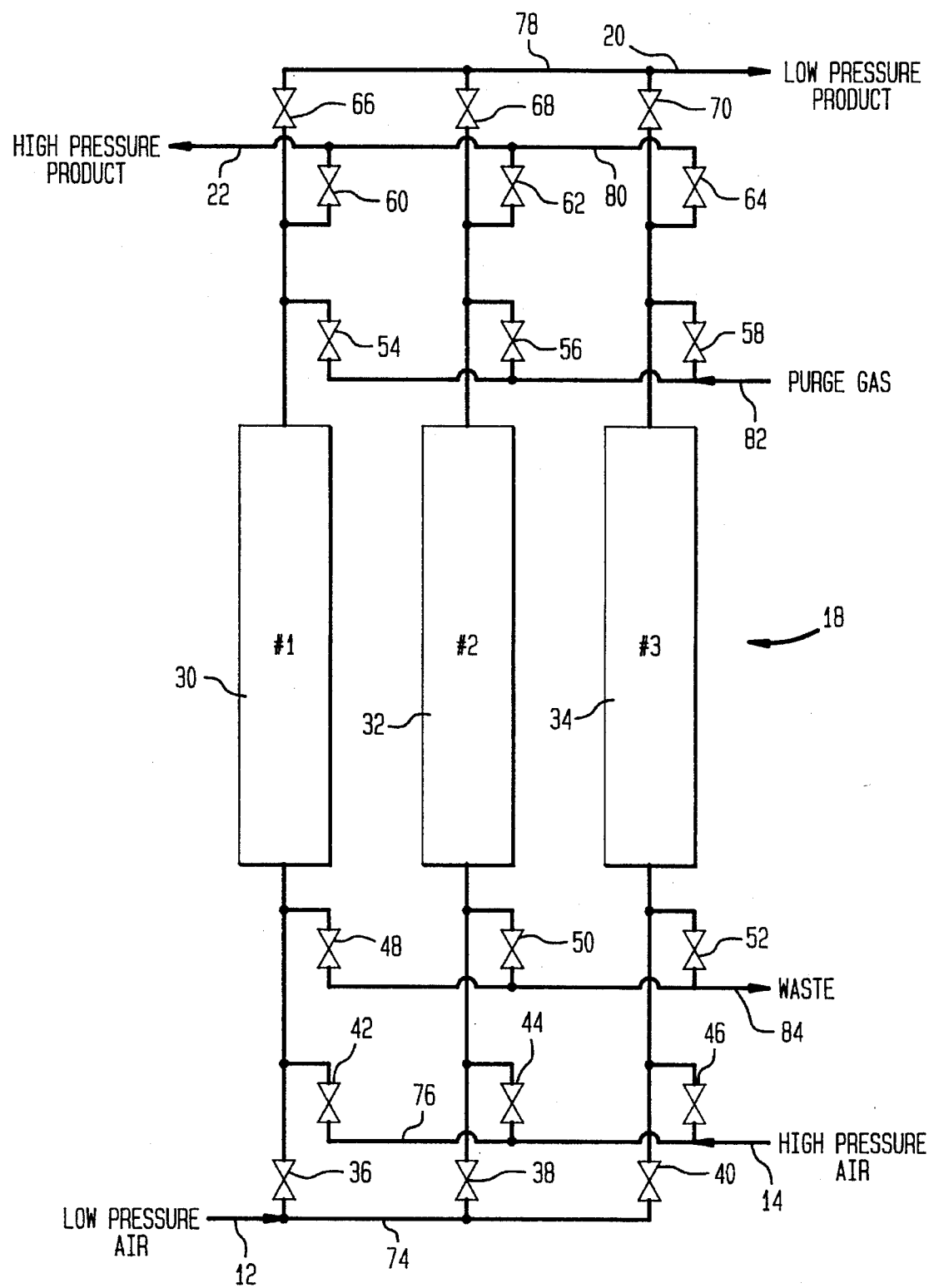
FIG. 2 is a schematic illustration of the pre-purification unit illustrated in FIG. 1.

With reference to FIG. 2, pre-purification unit 18 can be provided with first, second and third adsorbent beds 30, 32 and 34, respectively. First, second and third adsorbent beds 30–34 can be formed of canisters filled with silica gel activated carbon, activated alumina, zeolite, etc. or combinations thereof to adsorb moisture and carbon dioxide present within the air.

Main and subsidiary air streams 12 and 14 are routed to first, second and third adsorbent beds 30–34 by on-off valves 36–70. During the operation of pre-purification unit 18, main and subsidiary air streams 12 and 14 are respectively introduced into first, second and third adsorbent beds 30–34 by means of low and high pressure inlet manifolds 74 and 76. Low and high pressure purified air streams 20 and 22 are discharged through the use of low and high pressure discharge manifolds 78 and 80. Purge gas, which could be waste nitrogen, oxygen or oxygen-enriched fluid (depending upon the type of air separation unit 26) is introduced into first, second and third beds 30–34 through purge manifold 82. Waste is discharged from first, second and third beds 30–34 through waste manifold 84.

The following chart is a valve sequence for an operation of valves 36–70. In either a TSA cycle or a PSA cycle "0" indicates the valves are open. Otherwise the valves are closed.

TABLE 1

VALVE SEQUENCE FOR TYPICAL TSA AND PSA PPUs, FIG. 2

| TSA TIME (MIN) | 36 | 38 | 40 | 42 | 44 | 46 | 48 | 50 | 52 | 54 | 56 | 58 | 60 | 62 | 64 | 66 | 68 | 70 | PSA TIME (MIN) |
|---|---|---|---|---|---|---|---|---|---|---|---|---|---|---|---|---|---|---|---|
| 0–15 | 0 | | | | 0 | 0 | | | | | | | | 0 | | 0 | | | 0–3 |
| 15–25 | 0 | | | | | 0 | 0 | | | | | | | | 0 | 0 | | | 3–4 |
| 25–125 | 0 | | | | | 0 | 0 | | 0 | | | | | | 0 | 0 | | | 4–7 |
| 125–225 | 0 | | | | | 0 | 0 | | | 0 | | | | | 0 | 0 | | | * |
| 225–240 | 0 | 0 | | | | 0 | | | | | | | | | 0 | 0 | | | 7–10 |
| 240–255 | | 0 | | 0 | 0 | | | | | | | | | | 0 | | 0 | | 10–13 |
| 255–265 | | 0 | | 0 | | | | 0 | | | | 0 | | | | | 0 | | 13–14 |
| 265–365 | | 0 | | 0 | | | | 0 | | | 0 | 0 | | | | | 0 | | 14–17 |
| 365–465 | | 0 | | 0 | | | | | | 0 | 0 | 0 | | | | | 0 | | * |
| 465–480 | | 0 | 0 | 0 | | | | | | | | 0 | | | | | 0 | | 17–20 |
| 480–495 | | 0 | 0 | 0 | | | | | | | | 0 | | | | | | 0 | 20–23 |
| 495–505 | | 0 | | 0 | 0 | | | | | | | | 0 | | | | | 0 | 23–24 |
| 505–605 | | 0 | | 0 | 0 | | | | 0 | | | | 0 | | | | | 0 | 24–27 |
| 605–705 | | 0 | | 0 | 0 | | | | | 0 | | | 0 | | | | 0 | | * |
| 705–720 | 0 | 0 | 0 | | | | | | | | | | 0 | | | | 0 | 0 | 27–30 |

0 = VALVE IS OPEN, OTHERWISE CLOSED

With additional reference to FIG. 3 a temperature swing adsorption process is illustrated. In this process, each of the first, second and third beds 30–34 are subjected to a low pressure feed, a repressurization up to the high feed pressure (RPH) followed by high pressure feed stage. For instance, first bed 30 is first producing low pressure product and then high pressure product. In order to regenerate first bed 30, first bed 30 is subjected to a depressurization stage to initiate desorption of the more preferentially adsorbed components. The depressurization stage is followed by a hot purge stage and then a cold purge stage. These latter two purge stages further desorb the more preferentially adsorbed components. Thereafter, first bed 30 is subjected to a repressurization back to the low pressure feed (RPL) stage. As is evident, while one of first, second and third beds 30–34 is being subjected to a low pressure feed stage and thereby producing the low pressure air stream 20, another bed is subjected to high pressure feed stage and is thereby producing high pressure air stream 22.

With specific reference to the Table, from 0–15 minutes, valves 36, 44, 46, 62 and 66 are set in the open position. This allows first bed 30 to be subjected to the low pressure feed stage by virtue of valve 36 being opened. The low pressure product stream is discharged from first bed 30 to low pressure product header 78 by virtue of valve 66 being open. Valves 44 and 62 are both set in the open position to allow second bed 32 to be subjected to the high pressure feed stage and to discharge high pressure product stream 22 from high pressure product header 80. Third adsorbent bed 34 is being repressurized to high pressure and as a result, valve 46 is open so that part of the high pressure air can be introduced into third adsorbent bed 34.

During the next time interval of 15–25 minutes, second adsorbent bed 32 is subjected to the depressurization stage while third adsorbent bed 34 is to be subjected to the high pressure feed stage. In order to accomplish this, valve 50 is opened to allow second adsorbent bed 32 to countercurrently depressurize through waste header 84. Valve 64 opens to allow high pressure product to be introduced into high pressure product manifold 80.

During the 25–125 minute time interval, second adsorbent bed 32 is subjected to a hot purge stage by opening valves 50 and 56. During the cold purge stage (the 125–225 time interval), valves 50 and 56 remain open. The hot and cold purge stage is brought about by either heating the purge stream or heating the relevant adsorbent bed itself.

In the 225–240 minute time interval, in order to prepare second adsorbent bed 32 to be brought on as a producing bed acting in a low pressure feed stage, valve 38 is opened in order to pressurize second adsorbent bed 32 with main air stream 12. Valves 50 and 56 have to be re-set in the closed position during this time interval to end the purging of second adsorbent bed 32.

During the next 15 minutes, (the 240–255 minute time interval) first adsorbent bed 30 is subjected to high pressure repressurization stage by opening valve 42. Since first adsorbent bed is not producing at this point, valves 36 and 66 are closed. Second adsorbent bed 32 is now acting in place of first adsorbent bed 30 as a producing bed. As such, valve 68 is opened to produce low pressure air stream 20 from second adsorbent bed 32.

The cycle continues at 255 minutes with first adsorbent bed 30 being subjected to the high pressure feed stage by opening valve 60. At this point, third adsorbent bed 34 is subjected to a depressurization stage by opening valve 52. Since third adsorbent bed is therefore no longer serving as a producing bed, valves 46 and 64 are closed.

At 265 minutes and then at 365 minutes, third adsorbent bed is subject to hot and cold purge stages by opening valves 52 and 58. First and second adsorbent beds are still being subjected to high and low pressure feed stages.

During the succeeding 465 to 480 minute time interval, third adsorbent bed 34 is subject to a low pressure repressurization stage by opening valve 40 and closing valves 52 and 58. At 480 minutes into the cycle, third adsorbent bed 34 is subject to the low pressure feed stage by opening valve 70. Valve 44 is opened and valves 38 and 68 are closed to permit second adsorbent bed 32 to be subject to a high pressure repressurization stage.

During the 495 to 505 minute time interval, first adsorbent bed 30 is subject to a depressurization stage by opening valve 48 and closing valves 36 and 60. Thereafter, first adsorbent bed 30 is subject to hot and cold purge stages at 505 and 605 minutes by opening valve 54. During the last time interval of the cycle, from 705 to 720 minutes, first adsorbent bed 30 is subject to a low pressure repressurization stage by opening valve 36 and closing valves 48 and 54.

With additional reference to FIG. 4, pre-purification unit 18 could be operated in accordance with a pressure swing adsorption cycle. In such cycle, each bed is subjected to a low pressure feed stage, a high pressure repressurization stage (RPH), a high pressure feed stage, followed by depressurization, purge and low pressure repressurization stages. As is evident, one bed is undergoing a low pressure feed stage and is therefore a producing bed, producing low pressure air stream 20 while another bed undergoes a high pressure feed stage and thus produces high pressure air stream 22. For instance, when first adsorbent bed 30 is undergoing a low pressure feed stage, second adsorption bed 32 is undergoing a high pressure feed stage and third adsorbent bed is undergoing a high pressure repressurization stage. Thereafter, second adsorbent bed 32 is depressurized while third adsorbent bed 34 undergoes the high pressure feed stage. Following a depressurization stage to initiate desorption and a purge stage with a purge stream to complete desorption, second adsorbent bed 32 is subjected to a low pressure repressurization stage so that it can next serve as a producing bed, producing low pressure product stream.

With reference to the valve sequence chart, the valve sequences are the same as for the temperature swing adsorption process. For the sake of brevity, the above discussion relating to each and every valve opening and closing will not be repeated. However, the pressure swing adsorption process has a total cycle time that is far less than the temperature swing adsorption process. Moreover, there are no separate hot and cold purge stages. As such, an asterisk is placed after 4–7 minutes, 14–17 minutes, and 24–27 minutes to indicate that such rows are not part of the PSA cycle.

It should be mentioned that the present invention is not limited to the use of high and low pressure feed streams such as main and subsidiary air streams 12 and 14. There could be more feed streams such as an intermediate pressure stream to produce an intermediate pressure product stream. The modification required for a three pressure system, to the process outlined above, would involve adding an adsorbent bed so that the cycle was continuous (product streams are continuously being produced) and adding intermediate pressure repressurization and feed stages between the low pressure feed stage and the high pressure repressurization stage.

While the invention has been described with reference to a preferred embodiment, it will occur to those skilled in the art that numerous changes, omissions and additions can be made without departing from the spirit and scope of the present invention.

I claim:

1. An adsorption process including:

introducing at least high and a low pressure feed streams into a plurality of adsorption beds containing at least one adsorbent to adsorb at least one more preferentially adsorbed component contained within said high and low pressure feed streams, thereby to produce at least high and low pressure product streams from adsorption by said at least one adsorbent;

subjecting said plurality of adsorption beds to operational cycles, each having at least two adsorption stages comprising high and low pressure feed stages having said high and low pressure feeds streams introduced into said adsorption beds; at least two repressurization stages situated just prior to said high and low pressure feed stages, said at least two repressurization stages comprising a high pressure repressurization stage prior to said high pressure feed stage and a low pressure repressurization stage before said low pressure feed stage; and regeneration stages for desorbing said at least one more preferentially adsorbed component; and said operational cycles being conducted out-of-phase with respect to one another, such that said high and low pressure product streams are continually being produced.

2. The adsorption process of claim 1, wherein said regeneration stages include a depressurization stage to initiate desorption of said at least one more preferentially adsorbed component and hot and cold purge stages conducted by introducing hot and cold purge streams into said adsorbent beds to cause further desorption of said at least one more preferentially adsorbed component.

3. The adsorption process of claim 1, wherein said regeneration stages include a depressurization stage to initiate desorption of said at least one more preferentially adsorbed component and a purge stage conducted by introducing a purge stream into said adsorbent beds to cause further desorption of said at least one more preferentially adsorbed component.

4. The adsorption process of claim 1, further comprising compressing an inlet feed stream, dividing said inlet feed stream into first and second subsidiary feed streams, utilizing the first of the subsidiary feed streams as said low pressure feed stream and recompressing the second of the subsidiary feed streams to form said high pressure feed stream.

5. The adsorption process of claim 4, wherein said regeneration stages include a depressurization stage to initiate desorption of said at least one more preferentially adsorbed component and hot and cold purge stages conducted by introducing hot and cold purge streams into said adsorbent beds to cause further desorption of said at least one more preferentially adsorbed component.

6. The adsorption process of claim 4, wherein said regeneration stages include a depressurization stage to initiate desorption of said at least one more preferentially adsorbed component and a purge stage conducted by introducing a purge stream into said adsorbent beds to cause further desorption of said at least one more preferentially adsorbed component.

7. The adsorption process of claim 1, wherein said high and low pressure feed streams are made-up of air and said at least one more preferentially adsorbed component include carbon-dioxide and moisture.

8. The adsorption process of claim 1, wherein only high and low pressure feed streams are introduced into said plurality of adsorbent beds to solely produce high and low pressure product streams and said plurality of adsorbent beds comprises three adsorbent beds.

* * * * *